United States Patent [19]

Sampey et al.

[11] Patent Number: 5,408,179
[45] Date of Patent: Apr. 18, 1995

[54] METHOD AND APPARATUS FOR ANALYING TRAFFIC AND A SENSOR THEREFOR

[75] Inventors: Harry R. Sampey, Farmington; Jeffrey A. Geary, Normalville; James H. Schimpf, Derry, all of Pa.

[73] Assignee: Sampey Scientific, Ltd., Vanderbilt, Pa.

[21] Appl. No.: 766,471

[22] Filed: Sep. 26, 1991

[51] Int. Cl.$^6$ ................ G01R 33/04; G08G 1/042
[52] U.S. Cl. ........................... 324/253; 340/941
[58] Field of Search .................. 324/253–259; 340/941

[56] References Cited

U.S. PATENT DOCUMENTS

| | | | |
|---|---|---|---|
| 2,480,265 | 8/1949 | Rubenstein | 324/253 |
| 3,001,129 | 9/1961 | Knowles | 324/253 |
| 3,246,219 | 4/1966 | DeVol et al. | 324/253 |
| 3,458,802 | 7/1969 | Koerner | 324/41 |
| 4,052,595 | 10/1977 | Erdmann et al. | 340/941 |
| 4,201,908 | 5/1980 | Johnson et al. | 340/941 |
| 4,368,428 | 1/1983 | Dijkman | 324/178 |
| 4,509,131 | 4/1985 | Krasnjanski | 324/179 |
| 4,680,717 | 7/1987 | Martin | 364/436 |

Primary Examiner—Walter E. Snow
Attorney, Agent, or Firm—Webb Ziesenheim Bruening Logsdon, Orkin & Hanson

[57] ABSTRACT

A sensor for detecting a magnetically permeable mass by the disturbance of the earth's magnetic field in the vicinity of the sensor comprises a ferromagnetic strip with a conductive winding wrapped thereabout, a means for magnetically biasing the strip such that regardless of orientation the earth's magnetic field and the strip placing the ferromagnetic strip in a position on its BH curve where the slope is substantially linear, a means for generating an analog signal indicative of the inductance of the winding as the earth's magnetic field is disturbed in the vicinity of the ferromagnetic strip causing a change in the inductance of the winding, a means for digitizing the analog signal at spaced time intervals to produce a series of digitized values, and a digital computer means for processing the digitized signal values to characterize the presence and/or motion of the permeable mass.

19 Claims, 5 Drawing Sheets

METHOD AND APPARATUS FOR ANALYZING TRAFFIC AND A SENSOR THEREFOR

Filed herewith is a microfiche appendix comprising a portion of a list of source code useful for the implementation of the preferred embodiment disclosed herein. The appendix comprises one microfiche sheet having 39 frames.

A portion of the disclosure of this patent document contains material to which a claim of copyright protection is made. The copyright owner has no objection to the facsimile reproduction by anyone of the patent disclosure as it appears in the Patent and Trademark Office patent files or records, but reserves all other rights whatsoever.

1. Field of the Invention

This invention relates to methods and apparatus for detecting vehicles or other magnetically permeable masses and measuring and recording the number, classified by speed and/or length. It further relates to a novel sensor for detecting disturbances in the earth's magnetic field.

2. Background of the Invention

Prior art traffic counters have relied upon roadtube detection and magnetic loop sensing, among others. Each has drawbacks. A roadtube counter comprises a flexible length of pressure tubing laid across the roadway. At one end of the tube a pressure sensor is positioned to detect changes in air pressure as wheels compress the tube. The roadtubes are susceptible to damage and wear. The major disadvantage of current roadtube counters is that they normally will not count low-speed vehicles. A magnetic loop detector comprises a large coil of wire buried in a shallow trough in the roadway. The inductance of the coil due to the disturbance of the earth's magnetic field changes when a vehicle passes by. The change in inductance can be measured electronically. A major disadvantage of the loop detector is that the road must be torn up to emplace it. Loop detectors are susceptible to damage upon the thermal expansion of the highway. Most significant, loop detectors are unable to discriminate between closely passing vehicles. A common application of loop detectors has been as electronic treadles for activating stoplights.

Another type of traffic counter is based upon the flux gate magnetometer which, like the loop detector, senses disturbances in the earth's magnetic field. See, for example, Koerner U.S. Pat. No. 3,458,802 which discloses a flux gate magnetometer for counting vehicles. It cannot be used, however, for detecting speeds or lengths. As with similar devices, a count is registered when the analog signal from the detector exceeds a certain threshold and does not reset for another count until the signal has dropped below a certain lower threshold.

One problem with all magnetic sensors is the fact that an unchanging quiescent condition (no traffic present) is assumed. However, if a vehicle should loose a muffler or a large vehicle should be parked near the sensor, the quiescent condition will be changed.

The combination of a loop detector (in which the loop forms a part of an oscillator, the frequency of which is determined by the inductance of the loop) and a microprocessor is taught in Martin U.S. Pat. No. 4,680,717. The microprocessor is used to count cycles of the loop oscillator output to detect changes in frequency of the loop, to select input from multiple loop detectors and to output presence signals indicative of vehicles over one or more loops.

The use of two detectors, for example, roadtubes or loop detectors to measure speed, have the inherent drawbacks of the detectors themselves. Speed is calculated from the two roadtube or two loop systems by dividing the distance from the leading edge of one detector to the leading edge of the other by the time it takes for the vehicle to travel the distance. The loops are typically spaced apart the length of a passenger vehicle or more. The pulses generated by the tubes can be input to a microcomputer for analysis but the logic of the microcomputer is easily confused by queues, slow-moving vehicles and short headways. Short headways (times between vehicles) at high speeds will cause errors in classification of the two loop or two roadtube systems (counting two vehicles as one).

SUMMARY OF THE INVENTION

It is an advantage according to this invention to provide a method and apparatus for detecting and logging the count classified by speed and/or length of vehicles with two closely spaced magnetic detectors contained in a flat nonmagnetic enclosure that may be easily mounted to the highway surface and requires no lead wires.

It is a further advantage according to this invention to be able to program the counting apparatus during selected time periods controlled by a real-time clock and to log the roadway conditions (temperature and wet/dry condition) while logging the count classified by speed and/or vehicle length, thus collecting data for detailed analysis of the highway usage.

It is a still further advantage according to this invention that the entire profile of the disturbance of the earth's magnetic field by a passing vehicle can be used to discriminate between vehicles and for accurately matching the profiles of the same vehicle passing spaced sensors.

It is a yet further advantage according to this invention to provide a magnetic sensor for detecting the disturbance of the earth's magnetic field and generating a substantially undistorted disturbance profile that can be digitized and analyzed by a digital computer.

It is an advantage according to this invention that the drift or change in the ambient conditions in the vicinity of the detector that change the intensity of the earth's magnetic field under quiescent conditions (no traffic present) can be automatically accounted for through adjustments in the sensor.

Briefly, according to this invention, there is provided a sensor for detecting a magnetically permeable mass by the disturbance of the earth's magnetic field in the vicinity of the sensor. The sensor comprises a ferromagnetic strip with a conductive winding wrapped about it, means for magnetically biasing the strip such that, regardless of orientation of the earth's magnetic field and the strip, the ferromagnetic strip, is placed in a position on its BH curve where the slope is substantially linear; an electronic circuit for generating an analog signal indicative of the inductance of the winding as the earth's magnetic field is disturbed in the vicinity of the ferromagnetic strip causing a change in the inductance of the winding; an electronic circuit for digitizing the analog signal at spaced time intervals to produce a series of digitized values; and a microcomputer for processing the digitized signal values to characterize the presence and/or motion of the permeable mass.

In a preferred embodiment, a permanent magnet is positioned near the ferromagnetic strip to provide the magnetic bias. An analog signal indicative of the inductance of the winding comprises a tank circuit which includes the conductive winding as a resonant frequency determining component. The tank circuit is tuned to a selected frequency. An oscillator is provided for applying a signal at the selected frequency to the input of the tank circuit. A demodulator circuit at the output of the tank circuit provides an analog signal indicative of the disturbance of the earth's magnetic field. An analog-to-digital converter (ADC) converts the analog signal at spaced time intervals to produce a sequence of digitized values. The microcomputer processes the sequence of digitized signal values to filter the digitized values and to locate patterns in the sequence indicative of the passing of a magnetically permeable mass through the vicinity of the sensor.

According to an especially preferred embodiment, an apparatus for counting vehicles passing a fixed road position comprises first and second magnetic field detectors spaced a fixed distance apart along the direction of travel of the vehicles which generate first and second analog signals. The analog signals are digitized by ADCs to produce two digitized sequences. Digital circuits are provided to process the two digitized sequences to detect equivalent positions in each sequence, measure the elapsed time between the equivalent positions in each sequence and calculate the speed of vehicles whereby a count classified according to speed may be logged. Digital circuits are provided to analyze one of said sequences to determine the time a vehicle is over one sensor and to calculate the length of said vehicle passing at least one of said detectors whereby the count may be classified according to length.

Most preferredly, the digital circuits for analyzing the digital sequences comprise a programmed microcomputer or microcontroller with on-board memory, input/output ports and on-board ADC. In a preferred embodiment, the microcomputer is programmed with a first task to compare the digitized signal values of said digitized sequences to locate a subsequence comprising a preselected number of values indicative of a rise in the intensity of the magnetic field followed by a preselected number of decreasing values indicative of a drop in said intensity and selecting corresponding values within said subsequences as equivalent positions in said sequences. The microcomputer is programmed with a second task to calculate the speed of the vehicle from the difference in time between the equivalent positions in each sequence. The microcomputer is programmed with a third task for detecting and recording when the digitized values in at least one of said digital sequences rises from and returns to near a normal (quiescent) value and accepting the times as the time of onset and the time of offset of a vehicle. A delay in search for offset may be used to avoid the detection of false offset due to unusual signal intensity profiles. The delay may be variable based upon the average speed of traffic. A fourth task uses the time between the onset and offset and the speed to calculate the vehicle length.

Briefly, according to this invention, there is provided a method for counting vehicles passing a fixed road position and classifying said vehicles according to speed or length comprising the steps for:

a) generating first and second analog signals indicative of magnetic field strength in first and second magnetic field detectors spaced a fixed distance apart along the direction of travel of the vehicles;

b) converting the first and second analog signals to first and second digitized sequences, respectively, each comprised of a plurality of digitized signal values converted at spaced time intervals;

c) processing the first and second digitized sequences to detect equivalent positions in each sequence;

d) measuring the elapsed time between the equivalent positions in each sequence and calculating the speed of said vehicle;

e) optionally analyzing one of said sequences to determine the length of time the vehicle is thereabove;

f) optionally calculating the length of said vehicle passing at least one of said detectors; and g) accumulating and storing a count of passing vehicles categorized by speed or length or both.

BRIEF DESCRIPTION OF THE DRAWINGS

Further features and other objects and advantages will become clear from the following detailed description made with reference to the drawings in which.

DESCRIPTION OF THE PREFERRED EMBODIMENT

Figure 1:
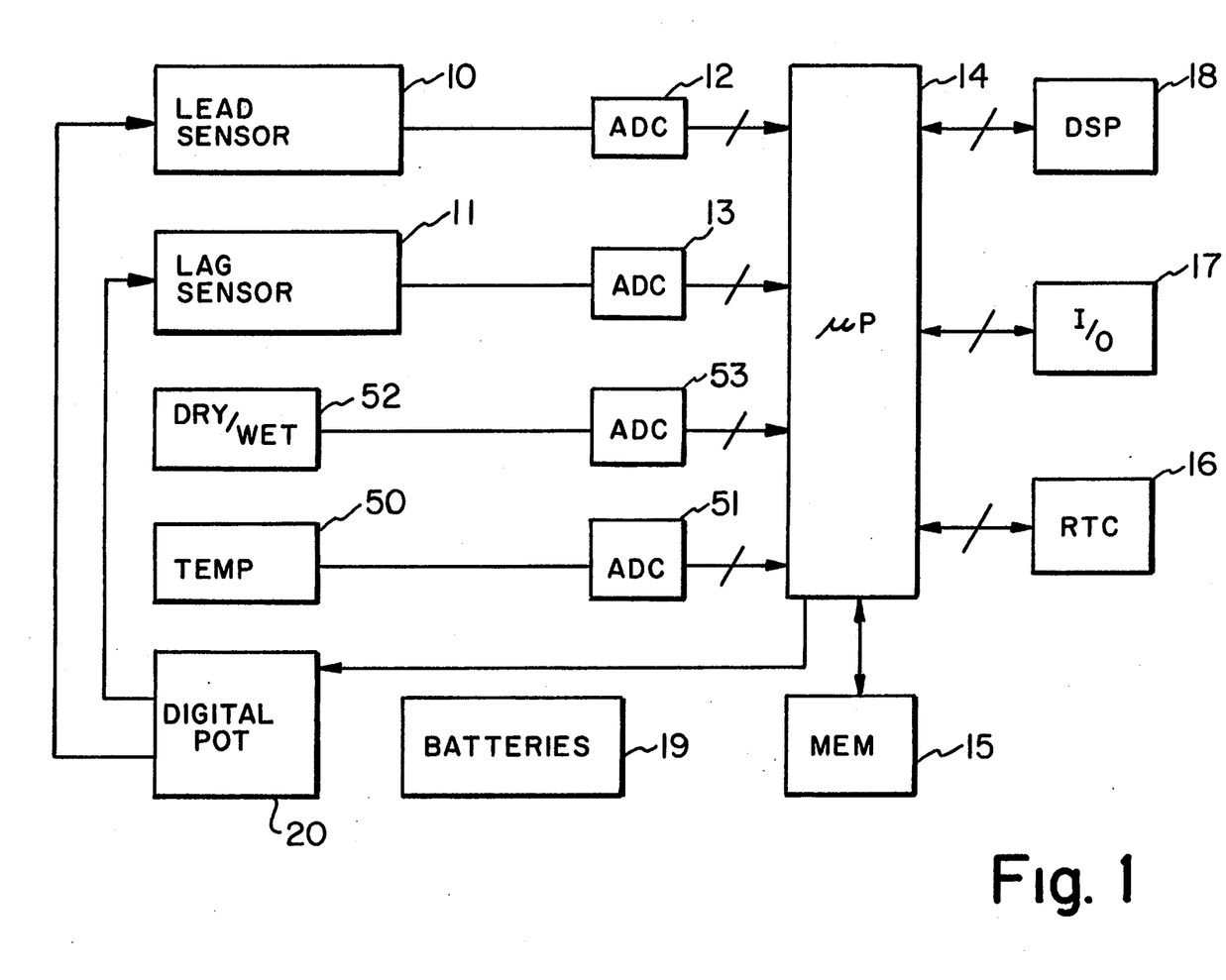
FIG. 1 is a block diagram illustrating the organization of circuitry for the practice of this invention.

Referring now to FIG. 1, there is shown a block diagram for an embodiment of this invention used for counting, speed and length classifying vehicle traffic on a highway. Lead and lag sensors 10 and 11 each comprise magnetic detectors spaced apart a selected distance approximately 8 to 12 inches in the direction of travel of traffic in a sealed enclosure with associated circuitry. The sensors generate analog signals indicative of the change in the earth's magnetic field caused by the passage of cars, trucks, buses, etc. Each analog signal is converted to a digitized signal at spaced time intervals by ADCs 12 and 13. The digitized signals are applied to parallel ports or registers of microprocessor 14. Preferably, the microprocessor has associated battery backed-up RAM memory 15, a real-time clock (RTC) 16, input/output (I/O) means 17 for programming and up-loading of data stored in memory 15, and, optionally, a digital signal processor (DSP) 18. The electrical and electronic elements described so far are powered by rechargeable batteries 19. (The connections between the batteries and the remaining elements are not shown on FIG. 1 for simplicity.) A digital potentiometer 20 controlled by the output of the microprocessor applies analog bias signals to each sensor.

Figure 2:
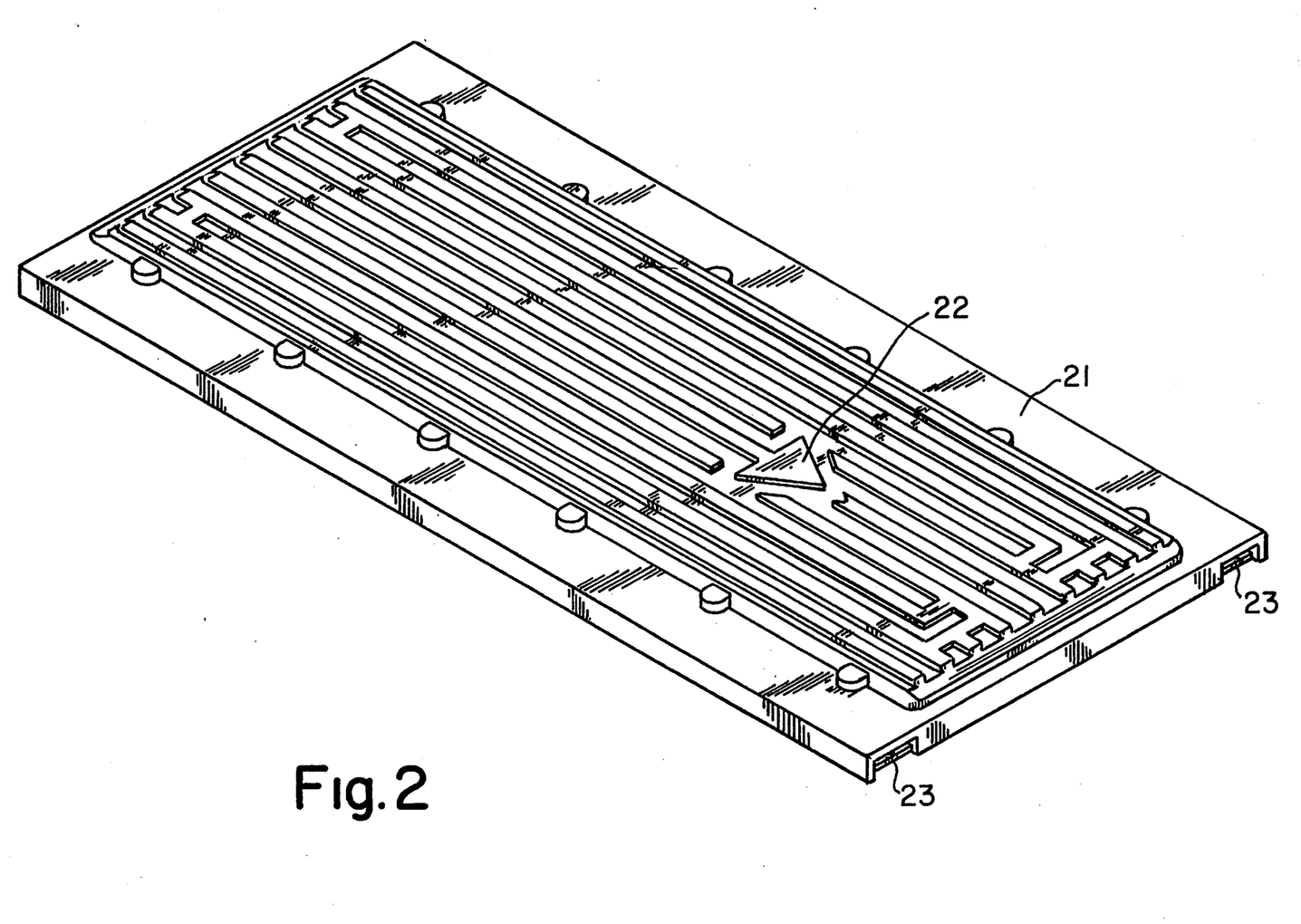
FIG. 2 is a perspective view of a nonmagnetic enclosure for housing the batteries and electronic components of a preferred embodiment of this invention.
Figure 3:
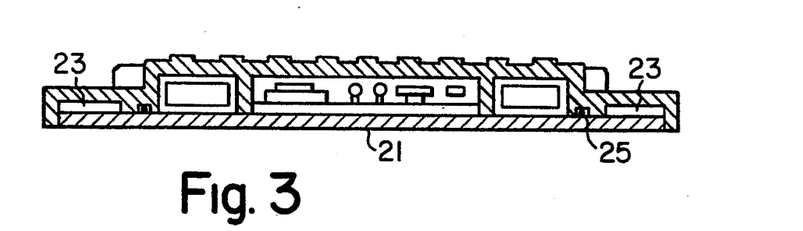
FIG. 3 is a section view through the nonmagnetic enclosure.

Referring to FIGS. 2 and 3, the electrical and electronic elements as well as the batteries may be packaged in a sealed nonmagnetic enclosure 21. The dimensions of the enclosure are 0.625 inch high, 5.5 inches wide and 12 inches long. The enclosure is comprised of two mating aluminum parts that are sealed by an O-ring 25 (see FIG. 3). The enclosure is provided with means for securing it to the surface of a highway. Straps may be passed through openings 23. The straps can then be nailed to the pavement. The outside of the casing is provided with indicia 22 to indicate how it should be oriented with respect to the direction of travel of vehicle traffic. This will assure that the detectors of the lead and lag sensors are properly positioned.

Figure 4:
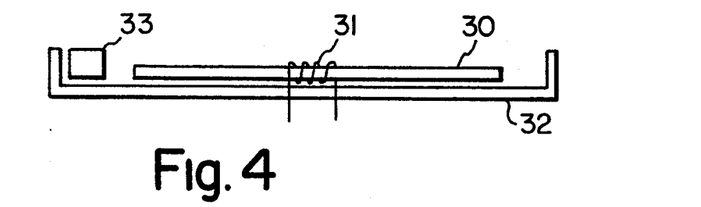
FIG. 4 is a side view of a magnetic detector (pick-up element) according to this invention.

Referring now to FIG. 4, the magnetic detector (pick-up element) of the magnetic sensors comprises a ferromagnetic strip 30 having a winding 31 wrapped thereon. The strip is mounted to a base 32. At one end of the strip, a small permanent magnet 33 is also mounted for reasons that will be more fully explained. In the preferred embodiment being described, the dimensions of the strip were 0.1 inches wide, 0.002 inch thick and two inches long. The strip was made of an alloy known as MU-80 and had a maximum relative permeability of about 350,000 (maximum). The winding is comprised of 90 coils of 34 gage wire. The magnet has a strength of 1700 oersted. In the preferred embodiment, the long axes of the ferromagnetic strips are generally parallel to the direction of travel of the vehicle traffic.

Figure 5:
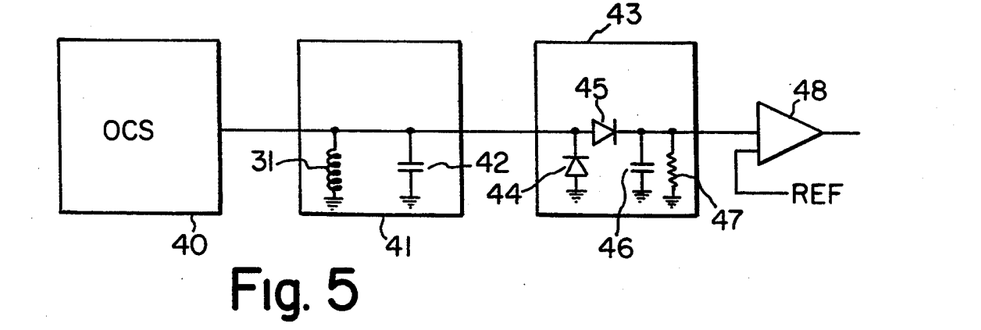
FIG. 5 is a generalized schematic diagram of the electronic circuit of a magnetic sensor according to this invention.

Referring to FIG. 5, the magnetic sensors comprise an oscillator 40 tuned to a selected frequency, say, 100 kilohertz, a tank circuit 41 comprising the winding 31 of a magnetic detector, and a capacitance 42 tuned to provide maximum impedance to the selected frequency of the oscillator 40 and a demodulator 43 comprising, for example, diodes 44 and 45, filter capacitor 46 and bleed resistor 47. When the earth's magnetic field is disturbed, the magnetic permeability of the ferromagnetic strip 30 will be increased or decreased and thereby the inductance of winding 31 will increase or decrease. A change in the inductance of the winding 31 will change the frequency to which the tank circuit 41 is tuned. Thus, the impedance of the tank circuit 41 to the 100 kilohertz signal will be lowered and the amplitude of the signal passed to the demodulator 43 will increase. Therefore, the voltage on the filter capacitance 46 will be indicative of the extent of the disturbance of the earth's magnetic field in the vicinity of the sensor.

The demodulated signal is applied to a differential amplifier 48 where a channel bias signal may be subtracted from the demodulated signal to enable the sensor to be adjusted for local magnetic conditions. A number of variations of the sensor described in this paragraph are possible, all of which are within the contemplation of this invention.

In the preferred embodiment of this invention, the microprocessor 14 is a Motorola MC68HC11E9 microcontroller that has eight on-board ADC ports, a group of four of which can be updated in about 250 microseconds. Thus, the analog outputs of the lead and lag sensors can be converted to digital values at intervals of about 250 microseconds. The sensor closest to the direction of approaching traffic is referred to as the lead sensor 10 and the other sensor is referred to as the lag sensor 11.

To get a sense of the time periods involved, consider that if the lead sensor 10 and the lag sensor 11 are spaced apart 8 inches, the front edge of a vehicle passing between them at 40 miles per hour will take less than 0.012 seconds (12 milliseconds). If the vehicle is 14 feet long, it will be over one of the sensors for about 0.24 seconds (240 milliseconds).

Figure 6:
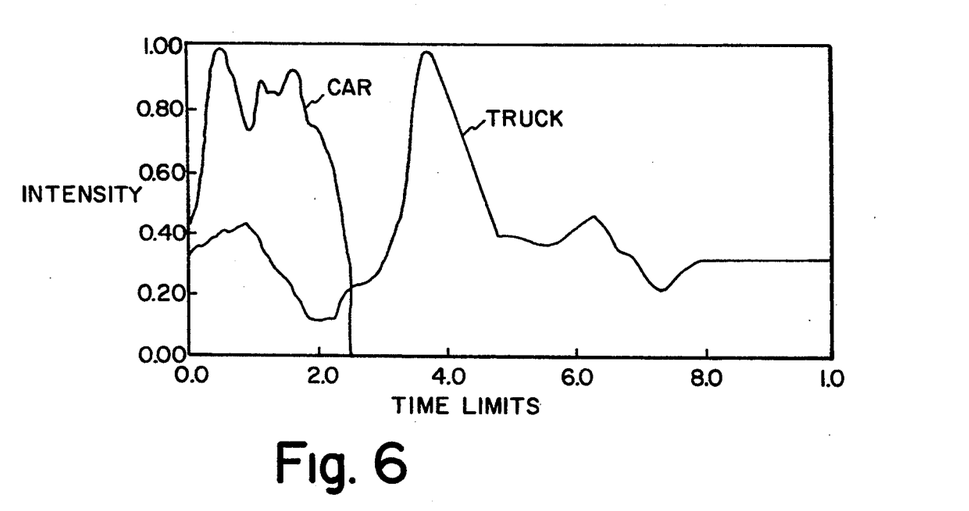
FIG. 6 illustrates the actual intensity profiles generated when an auto and a five-axle truck trailer pass over the magnetic sensors disclosed herein at 40 mph.

Different vehicles cause different signal intensity profiles to be generated as they pass over a magnetic sensor. The different profiles are directly related to the distribution of the magnetic mass along the axis of the vehicle. Typically, the profiles have a large rise and then fall corresponding to the front axle and engine passing over the sensor and then another rise and fall corresponding to the rear axle passing over the sensor. FIG. 6 illustrates the profiles created by a passenger car and a five-axle truck trailer traveling at 40 miles per hour. Many more complicated intensity profiles are encountered. Some, for example, look like a damped sine wave.

To determine the speed of a vehicle, it is necessary to identify equivalent points in the intensity profiles generated by the lead sensor 10 and the lag sensor and to determine the time difference therebetween. If the vehicle is travelling 40 miles per hour and the pick-up elements are spaced 8 inches apart, the time difference should be about 12 milliseconds. Because no two sensors are exactly alike, it is not a simple matter to identify an identical point in each profile. Each sensor channel can have a dc bias error which cannot always be corrected by the dc bias subtracted by the differential amplifiers 48. One cause of bias error might be that one or both the tank circuits are imperfectly tuned to the oscillator frequency under quiescent (no vehicle present) conditions. The gain in each sensor channel may not be exactly the same and, therefore, equivalent peaks may have different amplitudes even if there exists no dc bias error. Notwithstanding these errors, it is an advantage according to this invention that in almost all cases equivalent points on profiles generated by the lead and lag sensors can be identified. The ability to do so greatly decreases, however, if one or both of the profiles is distorted. If the profiles are distorted, either an erroneous speed will be calculated or the failure to find an equivalent point on the profiles will result in a dropped reading.

Applicants have discovered that the profiles will be distorted if the magnetic bias of the ferromagnetic strip 30 of the pick-up elements is not correct. Prior magnetic sensors such as magnetic flux gates and even permeability detectors have biased the ferromagnetic strip near a saturation knee on the BH (magnetization versus magnetizing force) curve. This bias, while essential in flux gates and harmless in other magnetometers, results in distortion of the profiles generated in sensors according to this invention.

When the ferromagnetic strip is placed in the earth's magnetic field, its magnetization moves to a location on the BH curve which is a function of the geometry of the strip and the maximum permeability of the strip.

Figure 7:
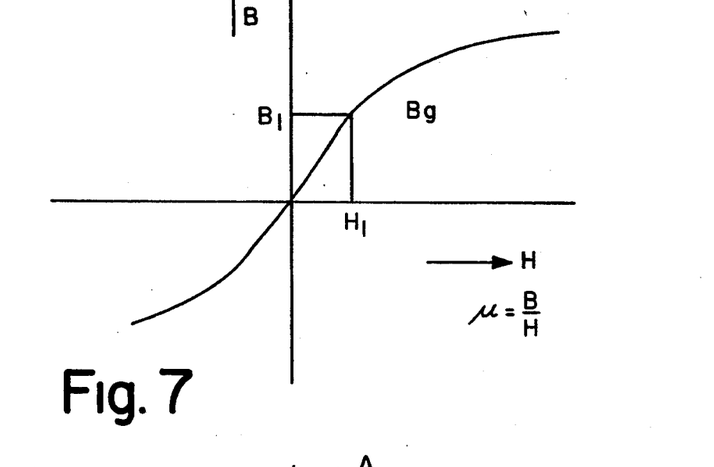
FIG. 7 illustrates an idealized BH curve for a ferromagnetic strip.

FIG. 7 illustrates an idealized BH curve for a ferromagnetic strip. (The curve is idealized by ignoring the hysteresis present in ferromagnetic materials.) The quiescent state magnetization is shown on the curve as $B_g$. The magnetic permeability of the ferromagnetic strip at this point is the ratio of the magnetization $B_1$ to the magnetizing force $H_1$ (the earth's magnetic field). The inductance of winding 31 is directly proportional to this permeability.

Figure 8:
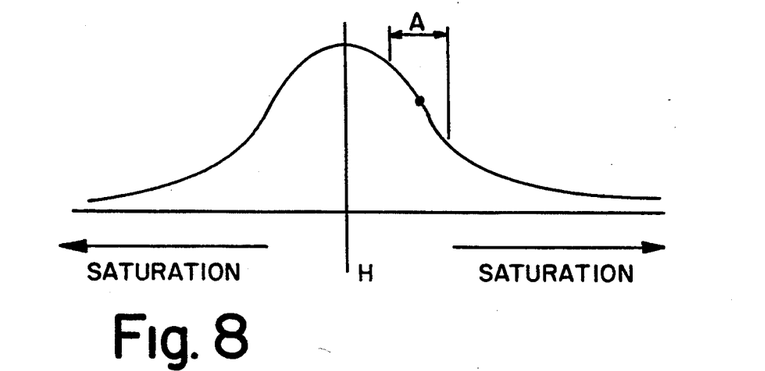
FIG. 8 illustrates the idealized relationship between magnetizing force and magnetic permeability for the ferromagnetic strip.

Now, since the magnetic permeability ($\mu$) is simply the slope of the BH curve, the magnetic permeability ($\mu$) versus magnetizing force (H) can be plotted as shown in FIG. 8. The permeability approaches zero at the saturation points on the BH curve and is maximum at some point inbetween. There is a relatively linear portion A of the permeability versus magnetizing force curve that has no inflection points. Biasing the ferromagnetic strip at a magnetization within this substantially linear range minimizes distortion of the intensity profiles. As long as the disturbance of the earth's magnetic field caused by a passing vehicle does not move the magnetization substantially out of this linear range, the intensity profile will not be distorted.

The ADCs 12 and 13 produce a sequence of values, referred to hereafter as the lead sequence and the lag sequence. The applicants have found that individual digitized values in each sequence can be scattered due to uncontrolled noise in the system and highway environment. However, by suitable filtering, the digitized values can be used to accurately define the intensity profiles. The following algorithm is a useful filter. The last filtered value is multiplied by 16−X and is added to X times the most recent value produced by an ADC and the result divided by sixteen to provide the next filtered value for that sequence. Obviously, one filter is required for the lead sequence and one for the lag sequence. The applicants have found that X=3 works very well.

Figure 9:
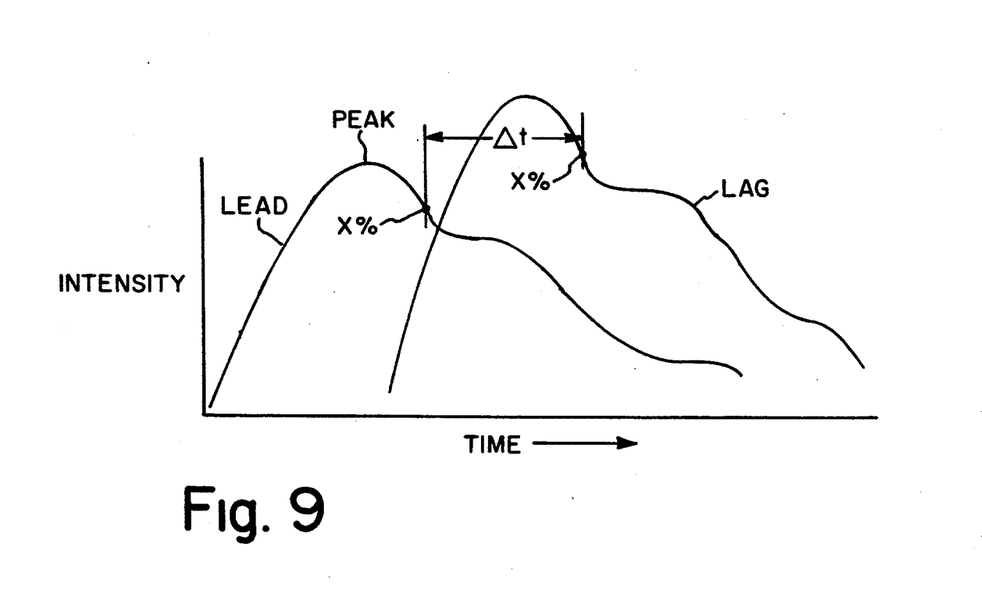
FIG. 9 illustrates the superimposed lead and lag intensity profiles caused by the same vehicle and the time difference between equivalent values on each profile.

A number of algorithms may be used to identify equivalent values in each digital sequence. Equivalent values are values in each sequence caused by the vehicle when at the same distance, respectively, to each sensor. So, if the vehicle is moving at 40 mph and values are input and added to each sequence every 250 microseconds, the equivalent value in the lag sequence would theoretically be 48 values after a corresponding value in the lead sequence. At 40 mph an error of 4 values will represent and error of about 3 mph. FIG. 9 illustrates graphically lead and lag intensity profiles and the equivalent values on each peak marked X %. The time difference $\Delta t$ between equivalent values is used to calculate speed.

Figure 10:
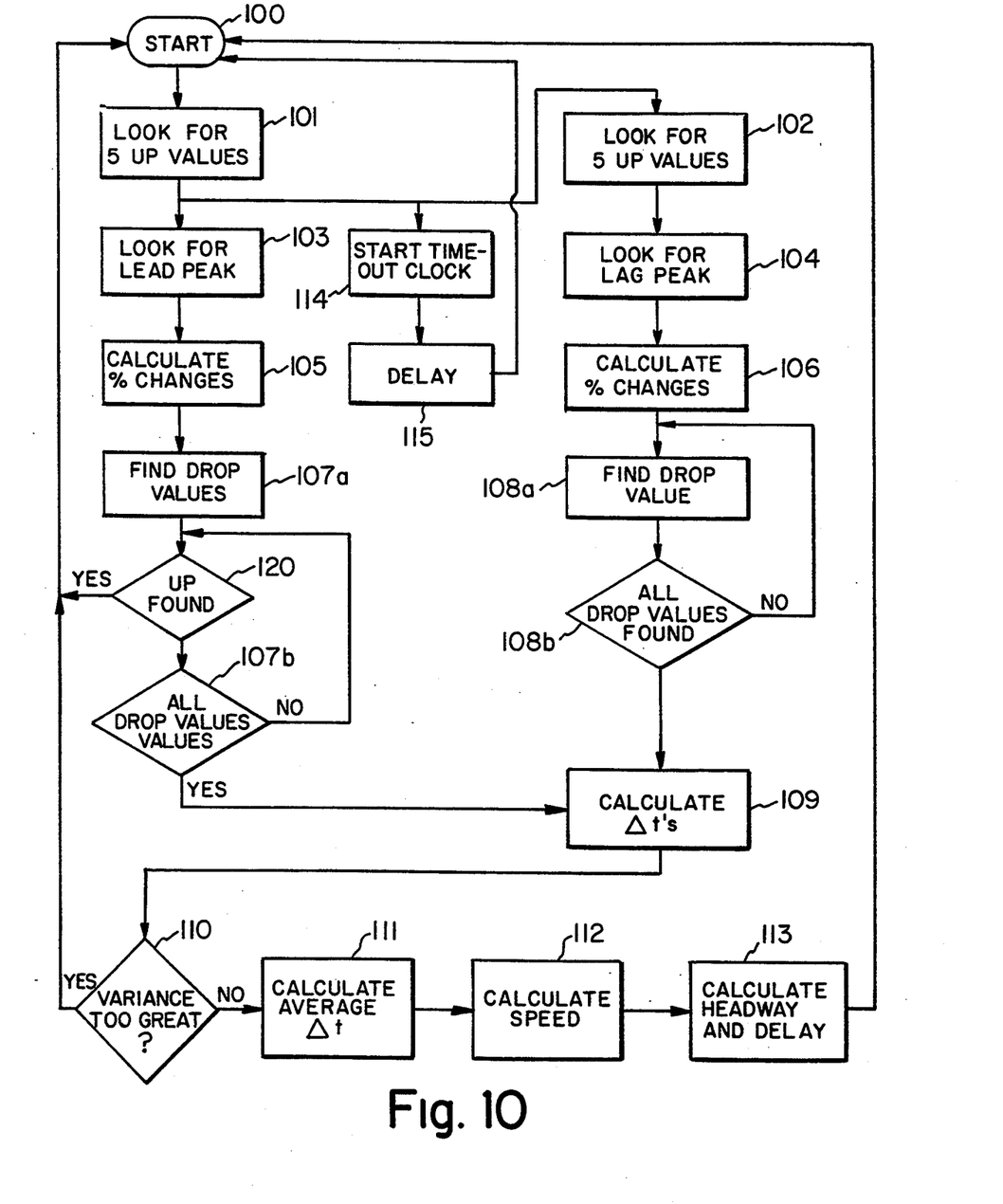
FIG. 10 is a flow diagram for a program for identifying equivalent values on the lead and lag profiles.

Referring to FIG. 10, the following computer program for finding equivalent values in two digitized sequences has been found to work well. This program is especially useful where only the limited amount of RAM memory on the microcontroller itself is used, thereby increasing processing speed. The lead sequence of digitized values corresponding to the lead sensor is watched for five successively increasing values 101. If before five increasing values are found a decreased value is encountered, then the watch starts over. This step results in the disregard of fluctuations in the intensity profile that are not attributable to the approach of an oncoming vehicle or are not the most pronounced portions of the profile. After five increasing values are encountered in the lead sequence, a time-out clock 114 is set to establish a period in which the entire matching process must be completed, say, 125 milliseconds. If the matching process is not complete in that period, it most likely cannot be completed for the vehicle in question and no further attempt to determine the speed is made.

After a delay 115, the process is restarted. The time-out clock reduces the likelihood of false speed determinations. At the time the time-out clock is set, a watch of the lag sequence for five increasing values is commenced 102. (The equivalent value in the lag sequence must come later than the equivalent value in the lead sequence.) Each sequence is then watched (more or less simultaneously) for the occurrence of a peak 103, 104 (the last increased value before a decreased value is encountered). When the peak value is encountered for the sequences (first for the lead sequence and then for the lag sequence) one or more percentage decreases are calculated. For example, the 4, 8, 12, 16, 20, and 24 percent decreases in value for each sequence are calculated 105, 106. These values will differ for each sequence if the peak values differ. Each sequence is then observed until the smallest (say 4%) calculated percentage drop is encountered 107a, 108a. The time or sequence position is noted. This procedure continues until all percentage drops have been encountered for both sequences and times or sequence positions noted 107b, 108b. As explained with reference to FIG. 10, the same percentage drop values in each sequence are considered equivalent values and the time between the occurrence of the equivalent values is calculated and recorded 109. These values are used to calculate the speed 112. Where multiple percentage drops are calculated, the average time 111 between the multiple equivalent values is used to calculate the speed.

By using a percentage drop after a prominent peak, the difference in gains between the analog circuits producing the intensity profiles will not effect the identification of the equivalent values.

The accuracy of the curve matching is further improved by the following two steps. If an up trend in sequence values after a first peak in the lead sequence is detected and before all percentage drops are encountered, the matching process is restarted 120. Also, if the times between the multiple equivalent values are not within a certain acceptable variation, then the matching process is restarted 110. Finally, as already explained, if after a certain time following the first peak in the sequence the equivalent values have not been found, the matching process is abandoned 111, it being more important to get accurate speeds than to log an erroneous reading.

Since all traffic on the same road during the same time period tends to travel at about the same speed, a rolling average of recently recorded speeds can be entered for the vehicle for which speed could not be calculated. Speed is calculated by dividing the average speed in seconds into the spacing in feet between the two sensors and multiplying by 1.4666 to obtain speed in miles per hour.

Every vehicle intensity profile exhibits some nulls or a drop in intensity to the quiescent value. To overcome these null areas, that is, to prevent counting two parts of one vehicle intensity profile as two different vehicles, the microcontroller is programmed to establish a delay (headway time) before looking for the next vehicle 113. This is safe since even in the most congested highway traffic, vehicles do not travel bumper-to-bumper. The headway time is adjusted based upon the speed of the last vehicle. Essentially, the headway is the time required for a fourteen foot vehicle or some small multiple (1.5 to 5) thereof to travel past the sensor at the last speed recorded.

By increasing the computing power of the entire system as by adding the digital signal processor (FIG. 1), it would be possible to match the multiple points on each intensity curve, in effect, sliding one curve over or near the other to obtain the best fit and using the translation of the curve along the time axis as the measure of time for calculating speed.

The period of time the lead or the lag sequence has values above a threshold may be taken as the time the vehicle is over the respective sensor. This time may be used along with the speed to calculate the length of the vehicle. Since every vehicle exhibits some nulls, it is necessary to use a procedure to ignore the nulls in a given profile.

As explained above, the microcontroller has eight analog-to-digital channels four of which can be read at one time. One of these can be used for logging temperature and another for logging road dry/wet. Referring to FIG. 1, the output voltage of an I.C. temperature sensor 50 can be applied to the ADC 51. The dry/wet sensor 52 may be detected by applying the voltage drop across two external electrodes to the ADC 53.

As earlier explained, the channel bias errors in each channel are compensated by the subtraction of an error correcting bias prior to the output of the lead and lag sensors. The correcting bias is established by inputting and averaging the sensor signals during periods of quiescence (no traffic present). If the average quiescent signal is greater than the expected null value, then the microcontroller outputs signals to a peripheral digital potentiometer 20 (see FIG. 1). The output of the digital potentiometer is a dc signal level that is applied to the differential amplifier 48 (see FIG. 5). The more precisely the channel bias errors are corrected, the more effective the various algorithms for determining equivalent values in the lead and lag sequences will be.

The microcontroller may be programmed to count and classify vehicles according to speed and length. Speed bins (memory locations), say, at 5 mph increments, and vehicle length bins, say, at 10 foot increments, are established and the count in an appropriate bin is incremented when a vehicle of the included speed or length is encountered. Since a real-time clock is included in the system, speed and length bins can be set up for established time intervals, say, one or two hours or even day long intervals, and the speed and length classified count is further classified according to the time of the day and/or day of the week. In normal operation, the counts are stored in the battery backed-up memory 15 (FIG. 1). The contents of the memory are up-loaded to a personal computer through the I/O 17, for example, after the sensor has been removed from the roadway.

Having thus described our invention with the detail and particularity required by the Patent Laws, what is claimed to be protected by Letters Patent is set forth in the following claims.

We claim:

1. A sensor for detecting a magnetically permeable mass by the disturbance of the earth's magnetic field in the vicinity of the sensor comprising:
    a) a ferromagnetic strip with a conductive winding wrapped thereabout, wherein the ferromagnetic strip may be biased in a position on its BH curve where the slope is substantially linear,
    b) means for magnetically biasing the strip such that regardless of the orientation of the earth's magnetic field and the strip, the ferromagnetic strip is biased within a range on its said BH curve where the slope is substantially linear and such that a disturbance of the earth's magnetic field does not move the magnetization of the ferromagnetic strip substantially out of this range,
    c) means for generating an analog signal indicative of the inductance of the winding as the earth's magnetic field is disturbed in the vicinity of the ferromagnetic strip causing a change in the inductance of the winding,
    d) means for digitizing the analog signal at spaced time intervals to produce a series of digitized values, and
    e) digital computer means for processing the digitized signal values to characterize the presence of the permeable mass.

2. A sensor for detecting a magnetically permeable mass by the disturbance of the earth's magnetic field in the vicinity of the sensor comprising:
    a) a ferromagnetic strip with a conductive winding wrapped thereabout, wherein the ferromagnetic strip may be biased in a position on its BH curve where the slope is substantially linear,
    b) a permanent magnet positioned near the ferromagnetic strip selected and positioned such that regardless of the orientation of the earth's magnetic field and the strip, the ferromagnetic strip is biased within a range on its said BH curve where the slope is substantially linear and such that a disturbance of the earth's magnetic field does not move the magnetization of the ferromagnetic strip substantially out of this range,
    c) means for generating an analog signal indicative of the inductance of the winding as the earth's magnetic field is disturbed in the vicinity of the ferromagnetic strip causing a change in the inductance of the winding, said generating means comprising:
        i) a tank circuit in which the conductive winding is a component, the tank circuit being tuned to a selected frequency and having an input and an output,
        ii) an oscillator for applying a signal at the selected frequency to the input of the tank circuit,
        iii) a demodulator circuit for demodulating the signal at the output of the tank circuit,
    d) means for digitizing the analog signal at spaced time intervals to produce a series of digitized values, and
    e) digital computer means for processing the digitized signal values to characterize the motion of the permeable mass, said digital computer programmed to filter the digitized values and to locate patterns in the filtered values indicative of the passing of a magnetically permeable mass through the vicinity of the sensor.

3. Apparatus for detecting the speed of a magnetically permeable mass by the disturbance of the earth's magnetic field in the vicinity of the two sensors comprising:
    a) first and second magnetic sensors each comprising:
        i) a ferromagnetic strip with a conductive winding wrapped thereabout, wherein the ferromagnetic strip may be biased within a range on its BH curve where the slope is substantially linear,
        ii) means for magnetically biasing the ferromagnetic strip such that regardless of the orientation of the earth's magnetic field and the strip, the ferromagnetic strip is biased in a position on its said BH curve where the slope is substantially linear and such that a disturbance of the earth's magnetic field does not move the magnetization of the ferromagnetic strip substantially out of this range,
b) means for generating an analog signal indicative of the inductance of the winding in the first and second sensors as the earth's magnetic field is disturbed in the vicinity of the ferromagnetic strips causing a change in the inductance of the winding,
c) means for digitizing the analog signals at spaced time intervals to produce two series of digitized values, and
d) digital computer means for processing the two series of digitized signal values to two series of filtered digitized signal values and for comparing the two series of filtered values to find spaced, equivalent positions in the series, measuring the elapsed time between equivalent positions in each series and calculating the speed of the mass as an inverse function of the elapsed time.

4. An apparatus for counting vehicles passing a fixed road position, said apparatus comprising:
a) first and second magnetic field detectors spaced a fixed distance apart along the direction of travel of the vehicles which generate first and second analog signals indicative of magnetic field strength at the detectors and the passage of vehicles thereby, said magnetic field detectors comprising:
  i) a ferromagnetic strip with a conductive winding wrapped thereabout, wherein the strip may be biased within a range on its BH curve where the slope is substantially linear,
  ii) means for magnetically biasing the strip such that regardless of the orientation of the earth's magnetic field and the ferromagnetic strip is biased within a range on said BH curve where the slope is substantially linear and such that a disturbance of the earth's magnetic field does not move the magnetization of the ferromagnetic strip substantially out of this range,
b) means for converting the first and second analog signals to first and second digital sequences, respectively, each comprised of a plurality of digitized signal values converted at spaced time internals,
c) means including a digital computer for processing the first and second digital sequences to detect spaced equivalent positions in each sequence,
d) means for accumulating and storing a count of passing vehicles, and
e) means for measuring the elapsed time between the spaced, equivalent positions in each sequence and calculating the speed of said vehicle whereby the count may be classified according to speed.

5. The apparatus according to claim 4 further comprising:
f) means for analyzing one of said sequences to determine the time the vehicle is over one sensor and to calculate the length of said vehicle passing at least one of said detectors whereby the count may be classified according to length.

6. The apparatus of claims 4 or 5 wherein each of said magnetic field detectors comprises:

a) a strip of ferromagnetic metal having magnetic permeability exceeding 10,000 and a length at least ten times its width, said strip having a substantially linear portion of its BH curve,
b) a coil of wire wound around said metal strip, and
c) means for magnetically biasing said strip within said substantially linear portion of the BH curve of the strip.

7. The apparatus of claim 6 further comprising means for compensating the detectors for the presence of fixed magnetically permeable masses in the vicinity of said detectors.

8. The apparatus of claim 7 wherein said compensating means comprise means for subtracting a bias from the first and second analog signals based upon the average quiescent condition logged over a selected averaging period.

9. The apparatus of claims 4 or 5 further comprising means for measuring and recording road surface temperature at selected times.

10. The apparatus of claim 9 wherein said temperature measuring means is an I.C. temperature sensor.

11. The apparatus of claims 4 or 5 further comprising means for measuring and recording road surface moisture.

12. The apparatus of claim 11 wherein said moisture measuring means comprises two electrodes exposed to said road surface and means for measuring resistance between said electrodes.

13. The apparatus of claims 4 or 5 further comprising a housing in which said apparatus is contained, said housing having a height above said roadway not exceeding 0.75 inch.

14. The apparatus of claim 13 wherein said housing comprises means allowing said apparatus to be readily affixed to and removed from said roadway.

15. The apparatus of claim 13 further comprising means for reading data stored therein into a data collection means without removing said apparatus from said roadway.

16. The apparatus according to claim 4 wherein said means for processing, measuring, accumulating and storing comprise, at least in part, a microprocessor.

17. The apparatus according to claim 16 in which the microprocessor is programmed with a first task to compare the digitized signal values of said digital sequences to locate a subsequence comprising a preselected number of values indicative of a rise in the intensity of the magnetic field followed by a preselected number of decreasing values indicative of a drop in said intensity and selecting corresponding values within said subsequences as equivalent positions in said sequences.

18. The apparatus according to claim 17 in which the microprocessor is programmed with a second task to calculate the speed of the vehicle from the difference in time between the equivalent positions in each sequence.

19. The apparatus according to claim 18 further comprising said microprocessor programmed with a third task for detecting when the digital values in a subsequence of at least one of said digital sequences returns to near a normal value and accepting a time within that subsequence as the time of offset of a vehicle.

* * * * *